(12) United States Patent
Chen et al.

(10) Patent No.: US 11,269,129 B2
(45) Date of Patent: Mar. 8, 2022

(54) LIGHT GUIDE PLATE AND MANUFACTURING METHOD THEREOF, FRONT-LIGHTING AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiuyun Chen, Beijing (CN); Fei Liang, Beijing (CN); Daekeun Yoon, Beijing (CN); Ming Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 326 days.

(21) Appl. No.: 16/483,606

(22) PCT Filed: Jan. 10, 2019

(86) PCT No.: PCT/CN2019/071174
§ 371 (c)(1),
(2) Date: Aug. 5, 2019

(87) PCT Pub. No.: WO2019/196528
PCT Pub. Date: Oct. 17, 2019

(65) Prior Publication Data
US 2021/0333464 A1    Oct. 28, 2021

(30) Foreign Application Priority Data

Apr. 13, 2018 (CN) .......................... 201810332890.4

(51) Int. Cl.
*F21V 8/00* (2006.01)
*G02F 1/1335* (2006.01)

(52) U.S. Cl.
CPC ......... *G02B 6/0051* (2013.01); *G02B 6/0065* (2013.01); *G02F 1/133524* (2013.01)

(58) Field of Classification Search
CPC .. G02B 6/0051; G02B 6/0065; G02B 3/0018; G02F 1/133524; B29D 11/00663; B29C 43/021; B29L 2011/0075
See application file for complete search history.

(56) References Cited

U.S. PATENT DOCUMENTS

| | | | | |
|---|---|---|---|---|
| 2007/0171671 A1* | 7/2007 | Kurokawa | ........... | G02B 5/0221 362/606 |
| 2012/0257409 A1* | 10/2012 | Huang | ................ | G02B 6/0035 362/603 |

(Continued)

*Primary Examiner* — Donald L Raleigh
(74) *Attorney, Agent, or Firm* — Nath, Goldberg & Meyer; Joshua B. Goldberg

(57) ABSTRACT

Provided is a light guide plate comprising a light guide plate body having a first surface and a second surface opposite to each other, and a light incident surface connected between the first surface and the second surface, the light guide plate body is provided with a plurality of optical microstructures, refractive index of the optical microstructure is greater than the refractive index of the light guide plate body; a bottom surface of the optical microstructure is attached to the first surface; and the optical microstructure is configured such that when light passes through and emits from the optical microstructure, an angle between an emergence direction of the light and a vertical line of the optical microstructure is smaller than an incident angle of the light incident on the bottom surface of the optical microstructure.

10 Claims, 2 Drawing Sheets

(56) References Cited

U.S. PATENT DOCUMENTS

| | | | |
|---|---|---|---|
| 2014/0056027 A1* | 2/2014 | Ma | G02B 6/0028 |
| | | | 362/611 |
| 2016/0187566 A1* | 6/2016 | Yao | H01L 33/58 |
| | | | 362/612 |
| 2018/0173052 A1* | 6/2018 | Shinohara | G02F 1/133615 |
| 2019/0121014 A1* | 4/2019 | Huang | G02B 6/0088 |

* cited by examiner

LIGHT GUIDE PLATE AND MANUFACTURING METHOD THEREOF, FRONT-LIGHTING AND DISPLAY DEVICE

CROSS-REFERENCE TO RELATED APPLICATION

This is a National Phase Application filed under 35 U.S.C. 371 as a national stage of PCT/CN2014/078779, filed May 29, 2014, an application claiming the benefit of Chinese Application No. 201310680989, filed Dec. 13, 2013, the content of each of which is hereby incorporated by reference in its entirety.

This is a National Phase Application filed under 35 U.S.C. 371 as a national stage of PCT/CN2019/071174, filed Jan. 10, 2019, an application claiming the priority of China Patent Application No. 201810332890.4, entitled "LIGHT GUIDE PLATE AND MANUFACTURING METHOD THEREOF, FRONT-LIGHTING AND DISPLAY DEVICE", filed to the China National Intellectual Property Administration (CNIPA) on Apr. 13, 2018, the entire contents of which are hereby incorporated by reference.

TECHNICAL FIELD

The present disclosure relates to the field of display technologies, and in particular, to a light guide plate and a manufacturing method thereof, a front-lighting and a display device.

BACKGROUND

Reflective liquid crystal display devices are currently being widely used in electronic price tags, e-books, outdoor advertising displays, and the like due to their low power consumption, and use ambient light to achieve display effects. Since the reflective liquid crystal display device largely depends on the intensity of ambient light, when the ambient light is insufficient, it is difficult for the user to observe the content displayed by the display device.

SUMMARY

The present disclosure provides a light guide plate including: a light guide plate body having a first surface, a second surface opposite to the first surface, and a light incident surface connected between the first surface and the second surface, wherein, the light guide plate body is provided with a plurality of optical microstructures, refractive index of the optical microstructure is greater than the refractive index of the light guide plate body; a bottom surface of the optical microstructure is attached to the first surface of the light guide plate body; and the optical microstructure is configured such that when light passes through and emits from the optical microstructure from the light guide plate body, an angle between an emergence direction of the light and a vertical line relative to the bottom surface of the optical microstructure is smaller than an incident angle of the light incident on the bottom surface of the optical microstructure.

Optionally, in any one longitudinal section of the optical microstructure, an angle between an extending direction of each side edge of the longitudinal section and a bottom edge of the longitudinal section is an acute angle.

Optionally, the optical microstructure is in a shape of a truncated cone.

Optionally, the optical microstructure has a dimension in any directions between 1 nm and 1000 nm.

Optionally, distribution density of the optical microstructures gradually increases from an end of the light guide plate body close to the light incident surface to an end of the light guide plate body away from the light incident surface.

Optionally, a grid layer is disposed on the second surface of the light guide plate body, and the grid layer includes a plurality of transflective portions.

Optionally, the plurality of transflective portions are arranged in rows and columns.

Optionally, the plurality of transflective portions includes a plurality of first transflective strips and a plurality of second transflective strips, the first transflective strip intersects with the second transflective strip to form a grid structure.

Accordingly, the present disclosure also provides a manufacturing method of light guide plate including: providing a light guide plate body having a first surface and a second surface opposite to each other, and a light incident surface connected between the first surface and the second surface; forming a plurality of optical microstructures on the first surface of the light guide plate body, wherein refractive index of the optical microstructure is greater than the refractive index of the light guide plate body; a bottom surface of the optical microstructure is attached to the first surface of the light guide plate body; and the optical microstructure is configured such that when light passes through and emits from the optical microstructure from the light guide plate body, an angle between an emergence direction of the light and a vertical line relative to the bottom surface of the optical microstructure to be smaller than an incident angle of the light incident on the bottom surface of the optical microstructure.

Optionally, the step of forming the plurality of the optical microstructures on the first surface of the light guide plate body includes: forming an optical adhesive layer on the first surface of the light guide plate body; and processing laser-etching to the optical adhesive layer to form the plurality of the optical microstructures.

Optionally, the step of forming the plurality of the optical microstructures on the first surface of the light guide plate body includes: making a transfer mould having a plurality of grooves that are in one-to-one correspondence with the plurality of optical microstructures and that match with the plurality of optical microstructures in shapes; filling each of the plurality of grooves of the transfer mould with an optical adhesive to form the plurality of optical microstructures; and transferring the optical microstructure within the grooves onto the first surface of the light guide plate body.

Optionally, the manufacturing method further includes: forming a grid layer on the second surface of the light guide plate body by an evaporation process, and the grid layer includes a plurality of transflective portions.

Accordingly, the present disclosure also provides a front-lighting including a light-emitting member and a light guide plate described above; the light-emitting member is disposed opposite to a light incident surface of a light guide plate body of the light guide plate.

Accordingly, the present disclosure also provides a display device including a display panel and a front-lighting described above, the front-lighting is disposed on a display side of the display panel, and a first surface of a light guide plate body of a light guide plate of the front-lighting is disposed opposite to the display panel.

BRIEF DESCRIPTION OF THE DRAWINGS

The accompanying drawings are intended to provide a further understanding of the disclosure and form part of the specification for explaining the disclosure in conjunction with the following specific embodiments, but are not to be construed as limiting the disclosure. In the drawings.

DETAILED DESCRIPTION OF THE EMBODIMENTS

The specific embodiments of the present disclosure will be described in detail below with reference to the accompanying drawings. It should be understood that the specific embodiments described herein are only to illustrate and explain the present disclosure, not to be construed as limiting the disclosure.

Figure 1:
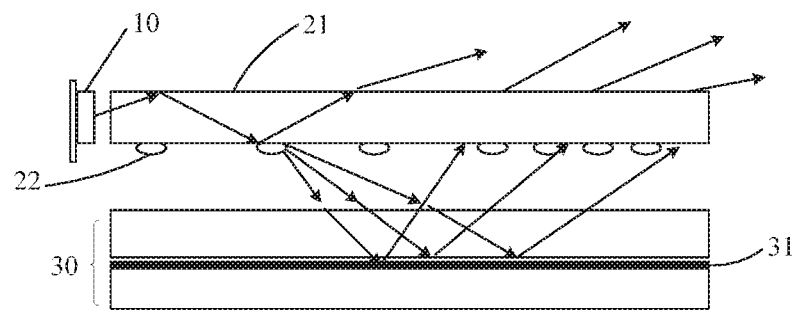
FIG. 1 is a partial light path diagram of a front-lighting in the related art.

FIG. 1 is a partial light path diagram of a front-lighting in the related art. As shown in FIG. 1, light of a light-emitting member 10 is incident on a light guide plate body 21, and is totally reflected in the light guide plate body 21, and then exits the light guide plate body 21 at a dot 22, thereby being incident on a reflective layer 31 in a display panel 30. Further, the light that is incident on the reflective layer 31 is reflected by the reflective layer 31 toward a display side of the display panel 30. In the front-lighting as shown in FIG. 1, the dot 22 provided on the light guide plate body 21 is in the shape of a rugby football. When the light passes through and emits from the dot 22, scattering occurs, and the angle between most of the scattered light and a direction vertical to the display surface is large. Here, "large angle" means that the angle between most of the scattered light and the direction vertical to the display surface is larger than an incident angle at which the light is incident on the dot. Therefore, the angle between the light reflected by the display panel 30 and the direction vertical to the display surface is large, resulting in a lower brightness at a vertical viewing angle (a position in front of the display panel 30 and vertical to the display panel 30).

Figure 2:
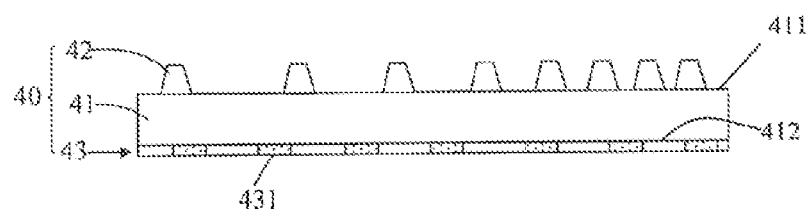
FIG. 2 is a schematic structural view of a light guide plate provided by the present disclosure.
Figure 3:
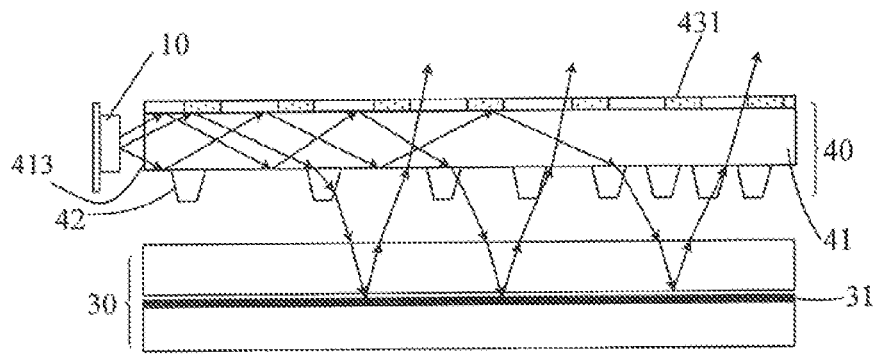
FIG. 3 is a schematic view showing an optical path of light emitted by the light-emitting member when the light guide plate of FIG. 2 is applied to a display device.
Figure 4A:
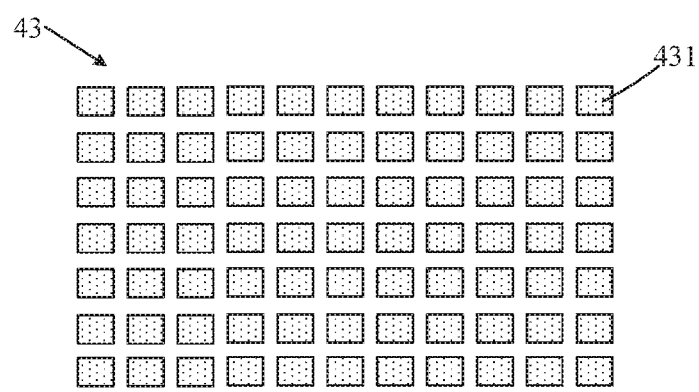
FIG. 4a and FIG. 4b are schematic views of two kinds of structures of the grid layer in the light guide plate.
Figure 4B:
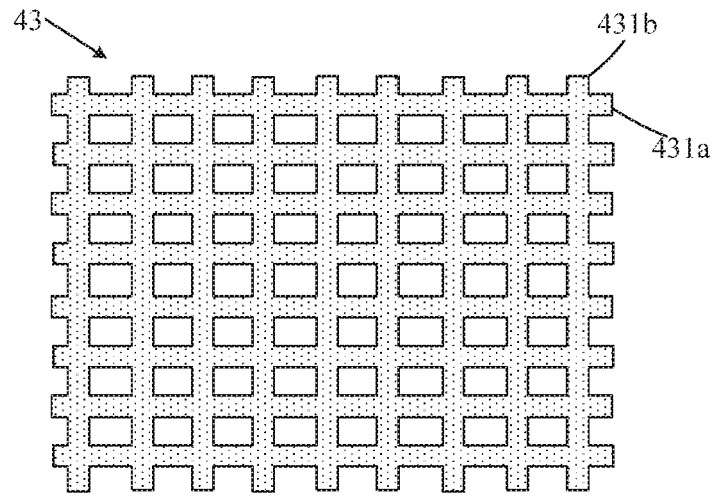

In order to increase the brightness at the vertical viewing angle, the present disclosure provides a light guide plate. FIG. 2 is a schematic structural view of a light guide plate provided by the present disclosure; FIG. 3 is a schematic view showing an optical path of light emitted by the light-emitting member when the light guide plate of FIG. 2 is applied to a display device; and FIG. 4a and FIG. 4b are schematic views of two kinds of structures of the grid layer in the light guide plate. As shown in FIG. 2 to FIG. 4b, the light guide plate 40 includes a light guide plate body 41 and a plurality of optical microstructures 42 disposed on the light guide plate body 41. The refractive index of the optical microstructures 42 is greater than the refractive index of the light guide plate body 41. The light guide plate body 41 has a first surface 411, a second surface 412 opposite to the first surface, and a light incident surface 413 connected between the first surface and the second surface. A bottom surface of the optical microstructure 42 is attached to the first surface of the light guide plate body 41. The optical microstructure 42 is configured such that when light passes through and emits from the optical microstructure 42 from the light guide plate body 41, an angle between an emergence direction of the light and a vertical line relative to the bottom surface of the optical microstructure 42 is smaller than an incident angle of the light incident on the bottom surface of the optical microstructure 42. It should be understood that the angle between the emergence direction of light and the vertical line relative to the bottom surface of the optical microstructure 42 is smaller than or equal to 90°.

In the present disclosure, the refractive index of the optical microstructures 42 is greater than the refractive index of the light guide plate body 41. Thereby, it is ensured that light incident from the inside of the light guide plate body 41 toward the bottom surface of the optical microstructure 42 can be incident into the optical microstructure 42. The optical microstructure 42 is configured to allow the angle between the emergence direction of the light passing through the optical microstructure 42 and the vertical line relative to the bottom surface of the optical microstructure 42 to be smaller than the incident angle of the light incident on the bottom surface of the optical microstructure 42. That is, when the light passes through the optical microstructure 42, the optical microstructure 42 is capable of adjusting the emergence direction of the light towards a thickness direction of the light guide plate 40 (i.e., a direction vertical to the first surface and the second surface). In other words, all of the emergent light emitted from the optical microstructure 42 is correspondingly adjusted by the optical microstructure 42 toward the thickness direction of the light guide plate 40, as compared to the incident light incident on the bottom surface of the optical microstructure 42. Therefore, as shown in FIG. 3, when the light guide plate 40 is disposed in front of the reflective display panel 30, the light passing through the optical microstructure 42 is reflected by the display panel 30 to be emitted from the second surface of the light guide plate 40, and the emergence direction of the emergent light is close to the vertical direction of the display surface, thereby improving the viewing brightness of the display panel 30 at the vertical viewing angle and the display effect.

The refractive index and shape of the optical microstructure 42 can be adjusted, such that when light passes through and emits from the optical microstructure 42 from inside of the light guide plate body 41, the angle between the emergence direction of the light and the vertical line relative to the bottom surface of the optical microstructure 42 is smaller than the incident angle of the light incident on the bottom surface of the optical microstructure 42. The shape of the optical microstructure 42 in the present disclosure can be set to: in any one longitudinal section of the optical microstructure 42 (a cross-section along the thickness direction of the light guide plate 40), an angle between an extending direction of each side edge of the longitudinal section and a bottom edge of the longitudinal section is an acute angle. That is, from the bottom to the top of the optical microstructure 42, the side edges of the longitudinal section gradually approach an axis of the optical microstructure 42, so as to facilitate the approach of the light emitted from the optical microstructure 42 toward the vertical direction. In this case, the bottom surface of the optical microstructure 42 is large to facilitate more light entering the optical microstructure 42.

More specifically, the optical microstructure 42 is in a shape of a truncated cone. This shape facilitates fabrication of the optical microstructures while ensuring effects obtained by the optical microstructures. In addition, the dimensions of the optical microstructures 42 in any direction are all on the order of nanometers, that is, between 1 nm and 1000 nm, and specifically may be several tens of nanometers. Thereby, it ensures that the human eye cannot see the microstructure during display, so as to improve picture quality.

In a practical application, the light-emitting member 10 is disposed at the light incident surface 413 of the light guide plate body 41, and the light is incident into the light guide plate body 41 from the light incident surface. In this case, the closer the position in the light guide plate body 41 is to the light-emitting member 10, the greater the light density will be. Thereby, the amount of light emitted from the position where the light guide plate 40 is closer to the light-emitting member 10 is larger. In order to compensate for this phenomenon, optionally, distribution density of the optical microstructures 42 gradually increases from an end of the light guide plate body 41 close to the light incident surface 413 to an end of the light guide plate body 41 away from the light incident surface 413, so that the light incident on the display panel 30 by the light guide plate 40 is distributed more uniformly. The "distribution density" herein refers to the density of the optical microstructures 42 arranged along the extending direction of the light guide plate body 41 (for example, the left-right direction in FIG. 3). The greater the distribution density of the optical microstructures 42 is, the smaller the spacing between the individual optical microstructures 42 will be.

In the display device including the light guide plate, the light guide plate 40 is disposed in front of the reflective display panel 30. Among ambient light or the light emitted by the light-emitting member 10, a part of the light is incident on the display panel 30 and is reflected to the display side (this part of the light is effective light); the other part of the light is not incident on the display panel 30, but is directly reflected back to the display side (this part of the light is invalid light). In order to improve light efficiency of the effective light, as shown in FIG. 2, a grid layer 43 is disposed on the second surface 412 of the light guide plate body 41, and the grid layer 43 includes a plurality of transflective portions 431. Optionally, the plurality of transflective portions 431 are evenly distributed to improve uniformity of the emergent light. Further, as shown in FIG. 4a, the plurality of transflective portions may be arranged in an array and arranged in rows and columns. Alternatively, as shown in FIG. 4b, the plurality of transflective portions 431 include a plurality of first transflective strips 431a and a plurality of second transflective strips 431b, and the plurality of the first transflective strips 431a intersect with the plurality of the second transflective strips 431b to form a grid structure. After the grid layer 43 is disposed, under reflection of the grid layer 43, when the light that is not incident on the display panel 30 is irradiated to the transflective portion 431, a part of the light is passed through and emitted from the transflective portion 431, and the other part is reflected back interior of the light guide plate body 41 and finally incident on the display panel 30, thereby improving the light efficiency of the effective light while ensuring normal display.

Figure 5:
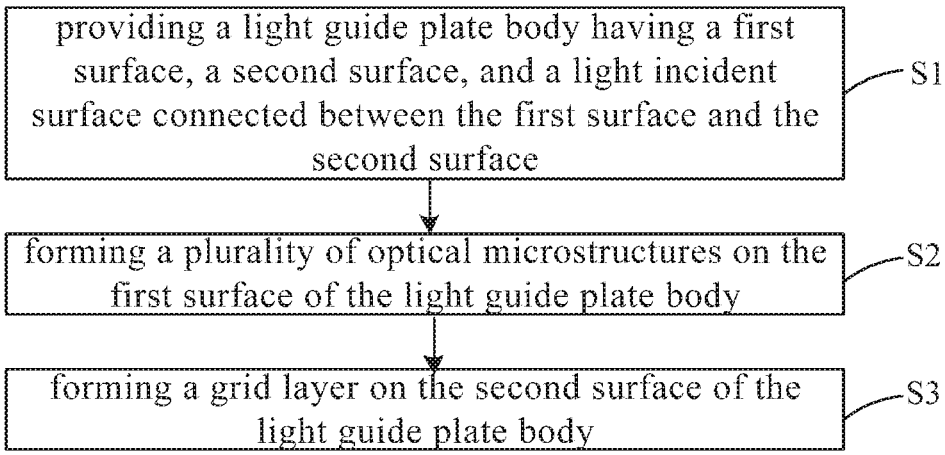
FIG. 5 is a schematic view showing a manufacturing method of a light guide plate in the present disclosure.

Accordingly, as shown in FIG. 5, the present disclosure also provides a manufacturing method of the aforementioned light guide plate, including:

S1. providing a light guide plate body having a first surface and a second surface opposite to each other, and a light incident surface connected between the first surface and the second surface;

S2. forming a plurality of optical microstructures on the first surface of the light guide plate body, wherein refractive index of the optical microstructure is greater than the refractive index of the light guide plate body; a bottom surface of the optical microstructure is attached to the first surface of the light guide plate body; and the optical microstructure is configured such that when light passes through and emits from the optical microstructure from the light guide plate body, an angle between an emergence direction of the light and a vertical line relative to the bottom surface of the optical microstructure is smaller than an incident angle of the light incident on the bottom surface of the optical microstructure.

As described above, the shape of the optical microstructure satisfies that in any one longitudinal section of the optical microstructure, an angle between an extending direction of each side edge of the longitudinal section and a bottom edge of the longitudinal section is an acute angle. Specifically, the optical microstructure may be in a shape of a truncated cone and may have a dimension in any directions between 1 nm and 1000 nm. Additionally, the distribution density of the optical microstructures gradually increases from an end of the light guide plate body close to the light incident surface to an end of the light guide plate body away from the light incident surface.

Specifically, step S2 includes: forming an optical adhesive layer on the first surface of the light guide plate body; and processing laser-etching to the optical adhesive layer to form the plurality of the optical microstructures.

Alternatively, step S2 can be performed by means of nano transfer. The step S2 particularly includes: making a transfer mould having a plurality of grooves that are in one-to-one correspondence with the plurality of optical microstructures and that match with the plurality of optical microstructures in shapes; and filling each of the plurality of grooves of the transfer mould with an optical adhesive to form the plurality of optical microstructures; and then, transferring the optical microstructure within each groove of the transfer mould onto the first surface of the light guide plate body.

Further, the method also includes step S3: forming a grid layer on the second surface of the light guide plate body, and the grid layer includes a plurality of transflective portions that are evenly distributed. The specific distribution of the plurality of transflective portions has been described above and will not be described herein. The grid layer in the step S3 may be formed by an evaporation process. The step S3 may be performed before the step S2 or after the step S2.

Accordingly, as shown in FIG. 3, the present disclosure also provides a front-lighting including a light-emitting member 10 and a light guide plate 40 as described above; the light-emitting member 10 is disposed opposite to a light incident surface of a light guide plate body 41 of the light guide plate 40. The light-emitting member 10 emits light to the light incident surface 413 of the light guide plate body 41. After the light is incident into the light guide plate body 41, total reflection occurs. When the light is irradiated to the optical microstructures 42, total reflection condition is destroyed to allow the light to be incident into the optical microstructures 42, and then the light passes through the optical microstructures 42. By arranging the distribution of the optical microstructures 42, the front-lighting can be formed into a uniform surface light source.

Figure 6:
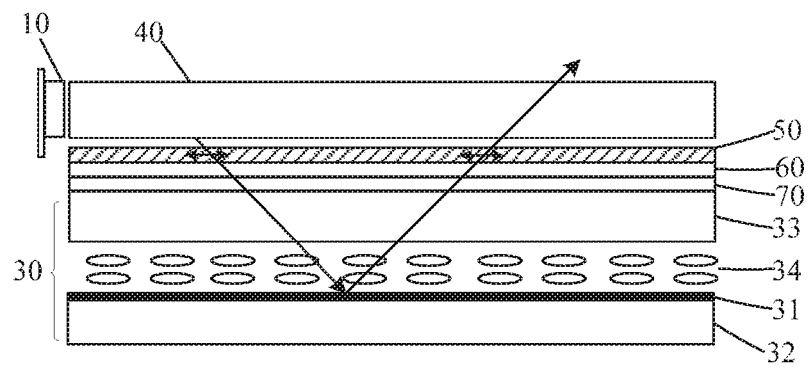
FIG. 6 is a schematic structural diagram of a display device provided by the present disclosure.

Accordingly, as shown in FIG. 6, the present disclosure also provides a display device including a display panel 30 and a front-lighting described above, the front-lighting is disposed on a display side of the display panel 30, and a first surface of a light guide plate body 41 of a light guide plate of the front-lighting is disposed opposite to the display panel 30. As shown in FIG. 6, the display panel 30 includes an array substrate 32 and an opposite substrate (cell-assembling substrate) 33 disposed opposite to each other. A liquid crystal layer 34 is disposed between the array substrate 32 and the opposite substrate 33. The opposite substrate 33 is disposed between the array substrate 32 and the front-lighting. A reflective layer 31 is disposed between the liquid crystal layer 34 and the array substrate 32, and a surface of the reflective layer 31 facing the liquid crystal layer 34 is a reflective surface.

Additionally, as shown in FIG. 6, a polarizer 50, a ½ wave plate 60, and a ¼ wave plate 70 are disposed in order between the front-lighting and the display panel 30 along a direction gradually close to the display panel 30. When the light of the front-lighting and the ambient light are irradiated to the display panel 30, linearly polarized light is first formed through the polarizer 50. After passing through the ½ wave plate 60 and the ¼ wave plate 70, phase of the light changes twice. Thereafter, the light enters the liquid crystal layer 34 and propagates in elliptically polarized light. Then, it is reflected by the reflective layer 31, and then passes through the liquid crystal layer 34, the ¼ wave plate 70, and the ½ wave plate 60 in order, and finally it is emitted as the linearly polarized light. In practical applications, a scattering film may be disposed on a side of the opposite substrate 33 facing away from the array substrate 32 according to requirement, so as to improve display uniformity at different viewing angles. The scattering film may be formed integrally with the polarizer 50.

Since the light guide plate 40 described above enables more light to be incident on the display panel 30 vertically or nearly vertically, the display device emits more light in the vertical direction, thereby increasing the brightness at the vertical viewing angle. Moreover, the grid layer 43 provided on the second surface of the light guide plate body 41 can improve the light efficiency of the display device.

The present disclosure also performs a simulation experiment on the display device of FIG. 6 and the display device of FIG. 1, so as to detect the light efficiency of the effective light emitted by the two display devices. In the two display devices, illuminance incident on the light guide plate body 41 is 104995 lx, and the illuminance of the effective light in the display device of FIG. 1 is 63627 lx, and the light efficiency of the effective light is 63627 l/104995 l=60.6%. In the display device of FIG. 6, the illuminance of the effective light is 83571 lx, and the light efficiency of the effective light is 83571/104995 l=79.5%. The light efficiency of the effective light is greatly improved as compared with the display device of FIG. 1.

It is to be understood that the above embodiments are merely exemplary embodiments employed to explain the principles of the present disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A light guide plate comprising: a light guide plate body having a first surface, a second surface opposite to the first surface, and a light incident surface connected between the first surface and the second surface,
wherein, the light guide plate body is provided with a plurality of optical microstructures, refractive index of the optical microstructure is greater than the refractive index of the light guide plate body; a bottom surface of the optical microstructure is attached to the first surface of the light guide plate body; and the optical microstructure is configured such that when light passes through and emits from the optical microstructure from the light guide plate body, an angle between an emergence direction of the light and a vertical line relative to the bottom surface of the optical microstructure is smaller than an incident angle of the light incident on the bottom surface of the optical microstructure,
wherein the optical microstructure has a dimension in any directions between 1 nm and 1000 nm,
wherein distribution density of the optical microstructures gradually increases from an end of the light guide plate body close to the light incident surface to an end of the light guide plate body away from the light incident surface, and
wherein a grid layer is disposed on the second surface of the light guide plate body, and the grid layer comprises a plurality of transflective portions.

2. The light guide plate according to claim 1, wherein in any one longitudinal section of the optical microstructure, an angle between an extending direction of each side edge of the longitudinal section and a bottom edge of the longitudinal section is an acute angle.

3. The light guide plate according to claim 2, wherein the optical microstructure is in a shape of a truncated cone.

4. The light guide plate according to claim 1, wherein the plurality of transflective portions are arranged in rows and columns.

5. The light guide plate according to claim 1, wherein the plurality of transflective portions comprise a plurality of first transflective strips and a plurality of second transflective strips, the first transflective strip intersects with the second transflective strip to form a grid structure.

6. A front-lighting, comprising a light-emitting member and a light guide plate according to claim 1, the light-emitting member is disposed opposite to a light incident surface of a light guide plate body of the light guide plate.

7. A display device, comprising a display panel and a front-lighting according to claim 6, the front-lighting is disposed on a display side of the display panel, and a first surface of a light guide plate body of a light guide plate of the front-lighting is disposed opposite to the display panel.

8. A manufacturing method of light guide plate, comprising:
providing a light guide plate body having a first surface and a second surface opposite to each other, and a light incident surface connected between the first surface and the second surface;
forming a plurality of optical microstructures on the first surface of the light guide plate body, wherein refractive index of the optical microstructure is greater than the refractive index of the light guide plate body; a bottom surface of the optical microstructure is attached to the first surface of the light guide plate body; and the optical microstructure is configured such that when light passes through and emits from the optical microstructure from the light guide plate body, an angle between an emergence direction of the light and a vertical line relative to the bottom surface of the optical microstructure is smaller than an incident angle of the light incident on the bottom surface of the optical microstructure,
wherein the step of forming the plurality of the optical microstructures on the first surface of the light guide plate body comprises:
making a transfer mold having a plurality of grooves that are in one-to-one correspondence with the plurality of optical microstructures and that match with the plurality of optical microstructures in shapes; and filling each of the plurality of grooves of the transfer mold with an optical adhesive to form the plurality of optical microstructures;

transferring the optical microstructures within the grooves onto the first surface of the light guide plate body.

9. The manufacturing method according to claim 8, wherein the step of forming the plurality of the optical microstructures on the first surface of the light guide plate body comprises:

forming an optical adhesive layer on the first surface of the light guide plate body;

processing laser-etching to the optical adhesive layer to form the plurality of the optical microstructures.

10. The manufacturing method according to claim 8, wherein the manufacturing method further comprises:

forming a grid layer on the second surface of the light guide plate body by an evaporation process, and the grid layer comprises a plurality of transflective portions.

* * * * *